United States Patent
Bradley et al.

(10) Patent No.: US 6,718,574 B1
(45) Date of Patent: Apr. 13, 2004

(54) BUNK LEVELING SUPPORT ASSEMBLY

(75) Inventors: James C. Bradley, New Haven, IN (US); Rodney J. Klinger, Fort Wayne, IN (US); Joseph Thaddeus Tiglao Penaloza, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/405,184

(22) Filed: Apr. 2, 2003

(51) Int. Cl.[7] ................................................. B60P 3/38
(52) U.S. Cl. ............................ 5/118; 5/9.1; 296/190.02
(58) Field of Search ............................... 5/118, 241, 244, 5/9.1; 296/190.02, 156, 19

(56) References Cited

U.S. PATENT DOCUMENTS

| | | | |
|---|---|---|---|
| 3,371,359 A | * 3/1968 | Dome | 5/118 |
| 4,196,483 A | * 4/1980 | Lefler et al. | 5/118 |
| 4,497,078 A | * 2/1985 | Vogel et al. | 5/118 |
| 4,669,139 A | 6/1987 | Richter et al. | |
| 4,713,851 A | 12/1987 | Rosquist | |
| 4,868,939 A | 9/1989 | Tagtow | |
| 5,822,813 A | * 10/1998 | Powell | 5/118 |
| 6,493,886 B1 | * 12/2002 | Vanpage et al. | 5/118 |
| 6,505,363 B2 | * 1/2003 | Davis | 5/118 |
| 6,631,526 B1 | * 10/2003 | Enright | 5/118 |

* cited by examiner

Primary Examiner—Michael F. Trettel
(74) Attorney, Agent, or Firm—Jeffrey P. Calfa; Dennis Kelly Sullivan; Susan L. Lukasik

(57) ABSTRACT

A pneumatically supported bunk assembly is dynamically leveled using compressed air provided by the vehicle. Level sensors determine deviation from the horizontal. Extension sensors associated with the pneumatic cylinders prevent over or under extension of the pneumatic cylinders.

11 Claims, 6 Drawing Sheets

BUNK LEVELING SUPPORT ASSEMBLY

BACKGROUND OF THE INVENTION

1. Field of the Invention

The present invention relates generally to vehicle bunks and, more particularly, to a dynamically leveled bunk for use on a truck.

2. Description of the Problem

Extended cab trucks afford room for a bunk behind the operator's seat allowing the driver a place to sleep when on break. Patents directed to such bunks have focused on providing motion damping for the bunk making the bunk more comfortable for a relief driver while the truck remains in motion. Examples of the such patents include U.S. Pat. No. 4,713,851 to Rosquist; U.S. Pat. No. 4,868,939 to Tagtow; and U.S. Pat. No. 6,493,886 to Vanpage et al. The Vanpage reference provides a mattress suspension including a support device attached between a lower frame attached to the cab floor and an upper frame which carries the mattress. The support device is described as an air sleeve or air cushion capable of providing an upward force to the upper frame. Air is supplied through a fluid connection to the vehicle's air system. The amount of air in the support device is user controlled.

While the art cited above attempts to deal with road shock and noise encountered by a moving vehicle, this art does not address the discomfort and disorientation experienced by operators attempting to sleep on a non-level mattress. The extensive under bed support arrangements taught by the prior art also compromise use of the space under the bunk mattress for internal storage.

SUMMARY OF THE INVENTION

According to the invention there is provided a bunk assembly having pneumatic supports distributed around the perimeter of a platform which support a mattress. The pneumatic supports provide full two axes leveling of the platform and mattress. Deviation of the mattress from the horizontal is detected by first and second level sensors mounted with respect to the platform in the plane of the platform. Different extensions of the supports are adjusted using vehicle compressed air. Control is automatic and is implemented using microcontroller technology. The leveling algorithms executed by the microcontroller filter and the level sensor input slow changes in orientation.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
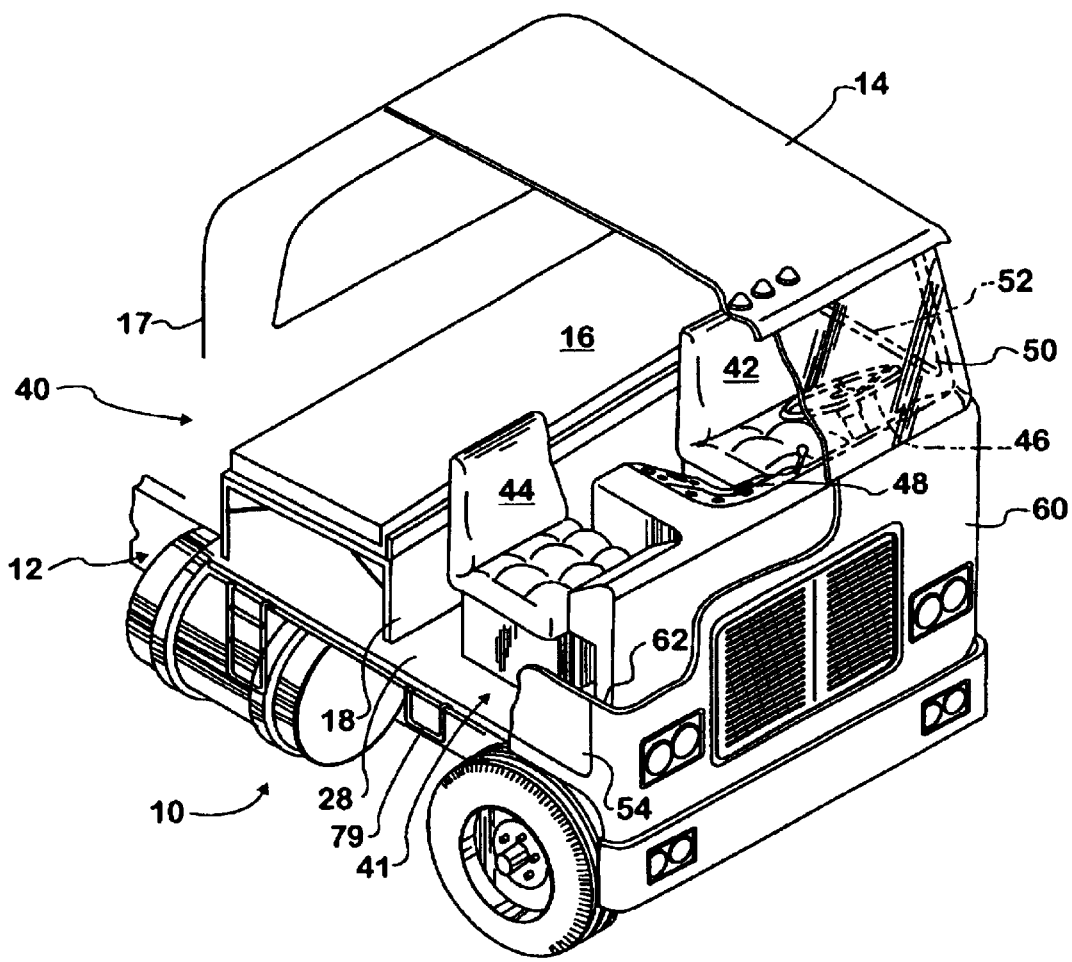
FIG. 1 is a perspective view of an extended cab truck partially cut away to show a bunk fitted aft of the forward seating area.

Referring now to the figures, in FIG. 1 is depicted a truck 10 having a cab 14 mounted on a pair of frame side rails 12 (passenger side only shown). Truck 10 is depicted as a cab over design, although the invention is equally applicable to engine forward designs, recreational vehicles or any other vehicle having bunks. Cab 14 comprises four exterior sidewalls, including a front sidewall 60, a driver sidewall (not visible), a passenger sidewall 62 and a backwall 17, which enclose an interior space 16. Cab 14 provides a usable aft area 40 and a forward operator area 41 where front seats 42 and 44 are located. Operator area 41 includes a driver seat 42 having access to a steering wheel 46 and an instrument and control panel 48. The driver seat 42 and passenger seat 44 are positioned to have good views through windshield 50 and to be next to doors 52 and 54 for easy egress from the vehicle. A bunk 18 is located in aft area 40 resting on floor or deck 28 and positioned snugly against the interior face of backwall 17 for use by an off duty driver/operator.

Figure 2:
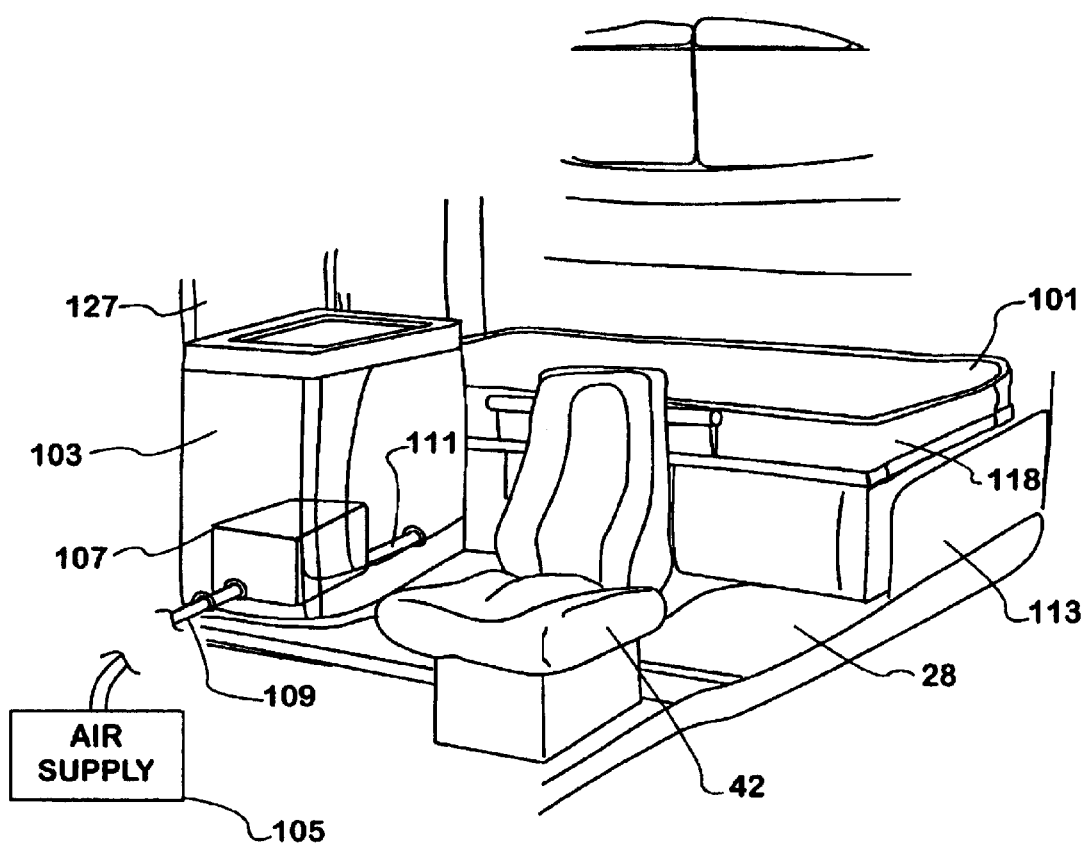
FIG. 2 is a perspective view of the cab interior.

FIG. 2 is a perspective view of a modular bunk and storage assembly 118 in accord with a preferred embodiment of the invention. Bunk assembly 118 is visible behind driver seat 42. Bunk assembly 118 rests on a bulkhead support 113 and provides a mattress 101 as a sleeping surface for a vehicle occupant. Bulkhead support 113 in turn is attached to floor or deck 28 and may be further attached to interior trim walls, or through the trim walls to the cab frame or sidewalls. A closet 103 located near one end of bulkhead 113 and encloses controller box 107. Controller box 117 comprises a microcontroller and air valves used in implementing leveling of mattress 101. An air hose 109 from a compressed air supply 105 may be introduced through one side of closet 103 to controller box 107. A bundle air lines 111 emerge from the other side of controller box 107 to locations within bunk assembly 118 and under mattress 101 to connect with mattress leveling air cylinders. Controller box 107 includes valves used to direct air into and exhaust air from the air cylinders. Mattress 101 overlies a platform which doubles as a cover for storage compartments within bulkhead 113 (not shown). Implementing the leveling function requires minimal, if any, modification to many bunk bulkhead supports.

Figure 3:
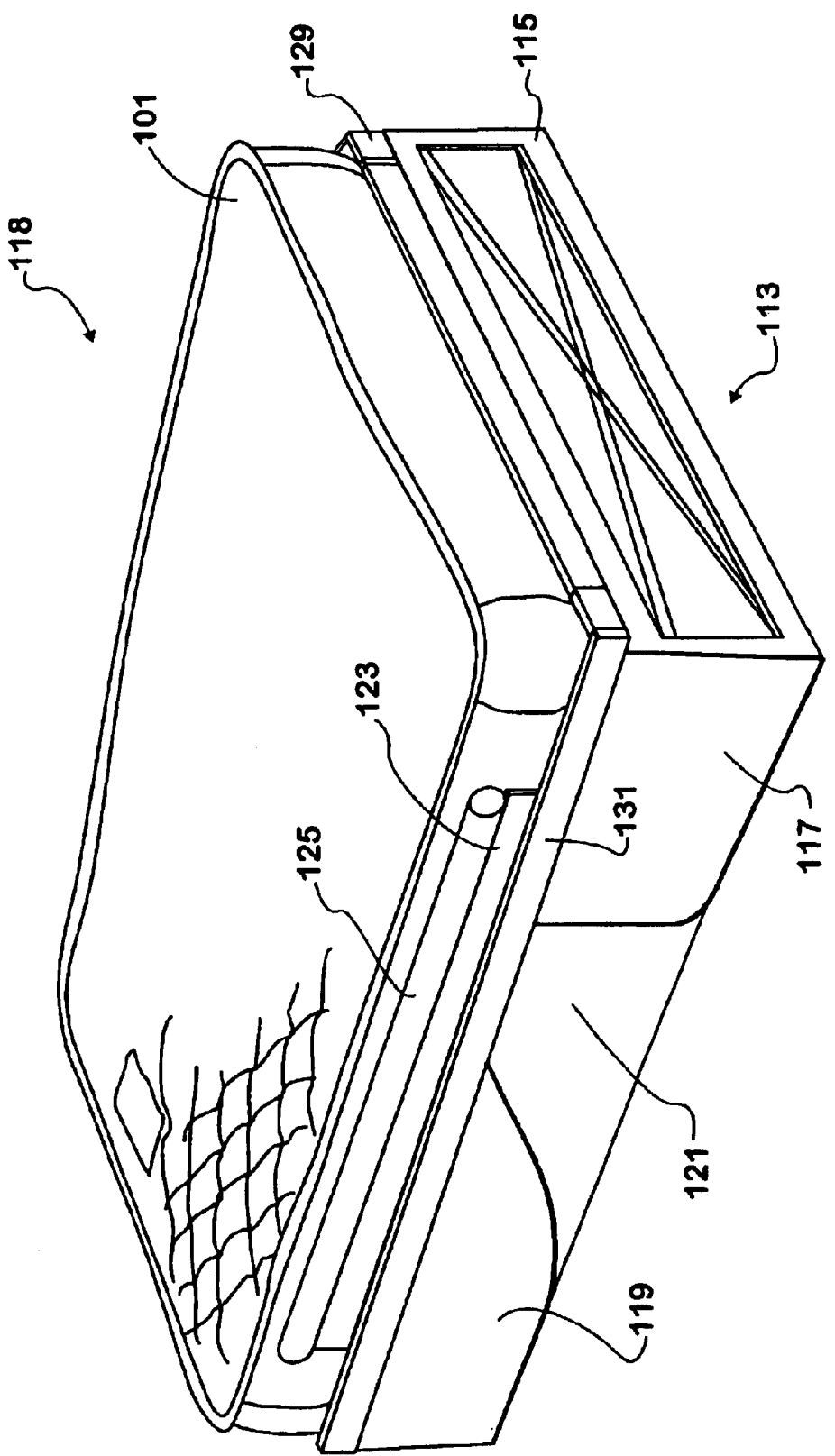
FIG. 3 is a perspective view of a bunk assembly in accord with a preferred embodiment of the invention.

Referring now to FIG. 3, the features of bunk assembly 118 are described with greater particularity. Mattress 101 is a conventional coil spring mattress resting on a support assembly 129. A mattress retaining flange 123 extends upwardly along a front face 131 of support assembly 129. A shin guard 125 edges the upper lip of mattress retaining flange 123. Bulkhead 113 may take a number of forms, the only requirement being those that are conventionally met in providing a raised platform for a bed. Bulkhead 113 is a generally rectangular support of sturdy construction. Support assembly 129 rests when lowered on storage compartment bulkheads 119, 117 and on side framing 115. Bulkhead 113 is divided into two storage compartments by a recessed bunk storage area 121 accessible from the front face of bulkhead 113 under support assembly 129.

Figure 4:
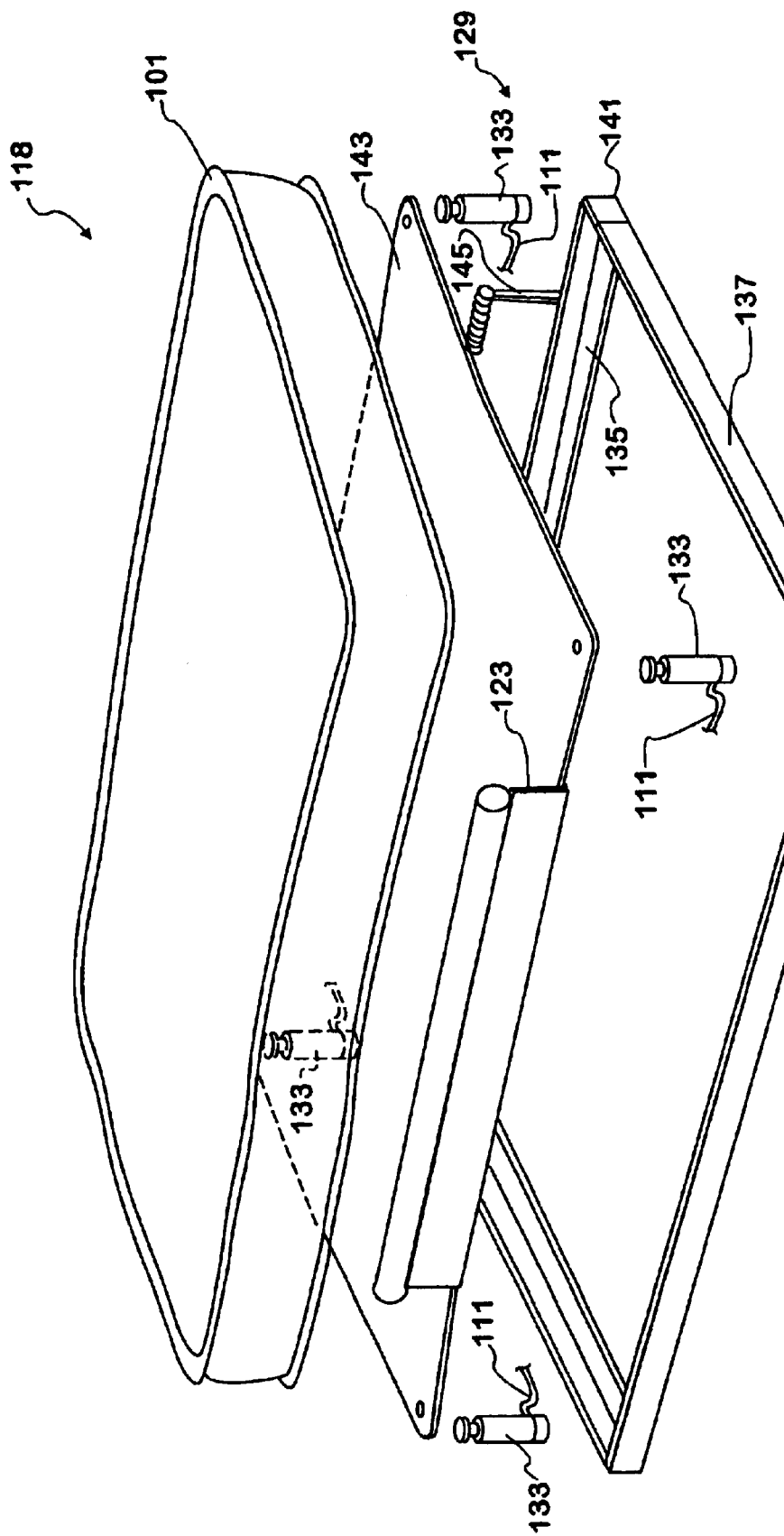
FIG. 4 is an exploded perspective view of the bunk assembly of FIG. 3.

Referring now to FIG. 4, an exploded perspective view of bunk assembly 118 illustrates the major mechanical features of the dynamic leveling feature of the invention. Mattress 101 rests on support assembly 129 which comprises in turn a rectangular base frame 141 and a rectangular mattress platform 143. Platform 143 and base frame 141 lie in generally horizontal planes, with platform 143 resting on four air cylinders 133 located near each of its four corners. Air cylinders 133 can be individually extended and retracted by adding or exhausting air therefrom through air lines 111. Air lines 111 may be positioned on shelf 135 and run to a point on the shelf along the rear face of base frame 141 before leaving the shelf for connection to the controller box 107. The location of the air lines 111 on shelf 135 allows support assembly 129 to be lifted open on hinge 145 without stretching the lines. By appropriate adjustment of the degree of extension of air cylinders 133, platform 143 may be kept level even when the vehicle bunk assembly 118 is installed on is not on a level surface, leaving base frame 141 shifted from a strictly horizontal orientation. Air cylinders 133 are mounted on a shelf 135 extending inwardly from a perimeter rail 137 of base frame 141. Horizontally extending hinge 145 is attached to a rear face of perimeter rail 137 and provides attachment points for connection to an interior wall of a vehicle or to bulkhead 113. Mattress retaining flange 123 is an upwardly turned extension from a front edge of mattress platform 143. Shelf 135 provides a platform supporting the four air cylinders 133.

Figure 5:
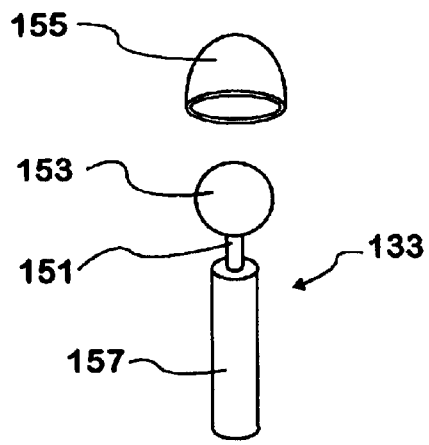
FIG. 5 is an elevation of an air cylinder and mating joint used with the bunk assembly of the invention.

FIG. 5 depicts a representative air cylinder 133 which includes a conventional piston shaft 151 extending from the cylinder body 157. Shaft 151 moves upwardly and downwardly depending upon the load on the cylinder and the quantity of air introduced to the cylinder. Shaft 151 terminates in a ball 153 which fits a cup 155 to form a ball joint. This ball joint is attached to the underside of a mattress platform 143 allowing the platform to be freely moved up and down independently at each corner. Air cylinders 133 not only allow the height of platform 143 to be independently adjusted at each corner, but also isolate the platform from some road noise and shocks.

Figure 6:
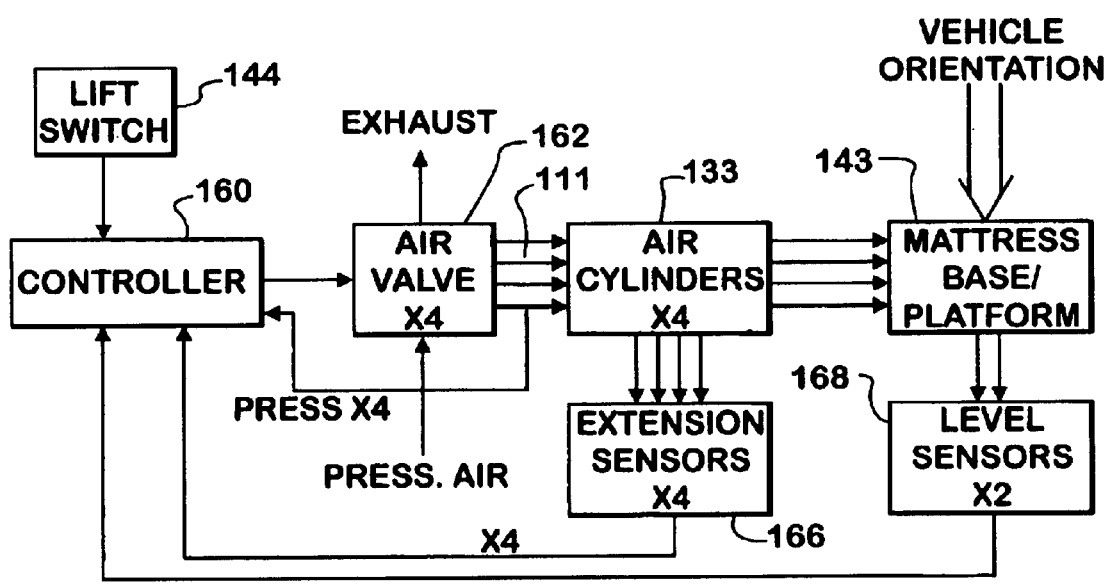
FIG. 6 is a block diagram of the invention.

FIG. 6 depicts the control arrangement for the dynamically leveled bunk. A microcontroller 160 which opens one of a set of four air valves 162 to allow air into any one of air cylinders 133 through one of air lines 111 or to exhaust air from any one of cylinders 133. Valves 162 may of course simply be held closed to keep the quantity of air in any of the cylinders constant. Associated with each air cylinder is a cylinder extension sensor 166, which may be implemented using a rheostat or similar device. Each of four cylinder extension sensors 166 is connected to return its signal to controller 160. The four air cylinders 133 are attached to and modify the orientation of mattress platform 143 relative to the horizontal. The orientation of platform 143 relative to the horizontal is also changed by changes in vehicle orientation. The orientation of platform 143 with respect to the level is sensed by two level sensors 168 which are mounted on the base perpendicularly with respect to one another. Controller 160 levels platform 143 by adjusting the air in air cylinders 133, with the limitation that the total extension of the air cylinders measured by the four extension sensors 166 remains constant. Movement of support assembly 129 toggles a lift switch 144, which disables changes in the level orientation of mattress platform 143 by controller 160.

Figure 7:
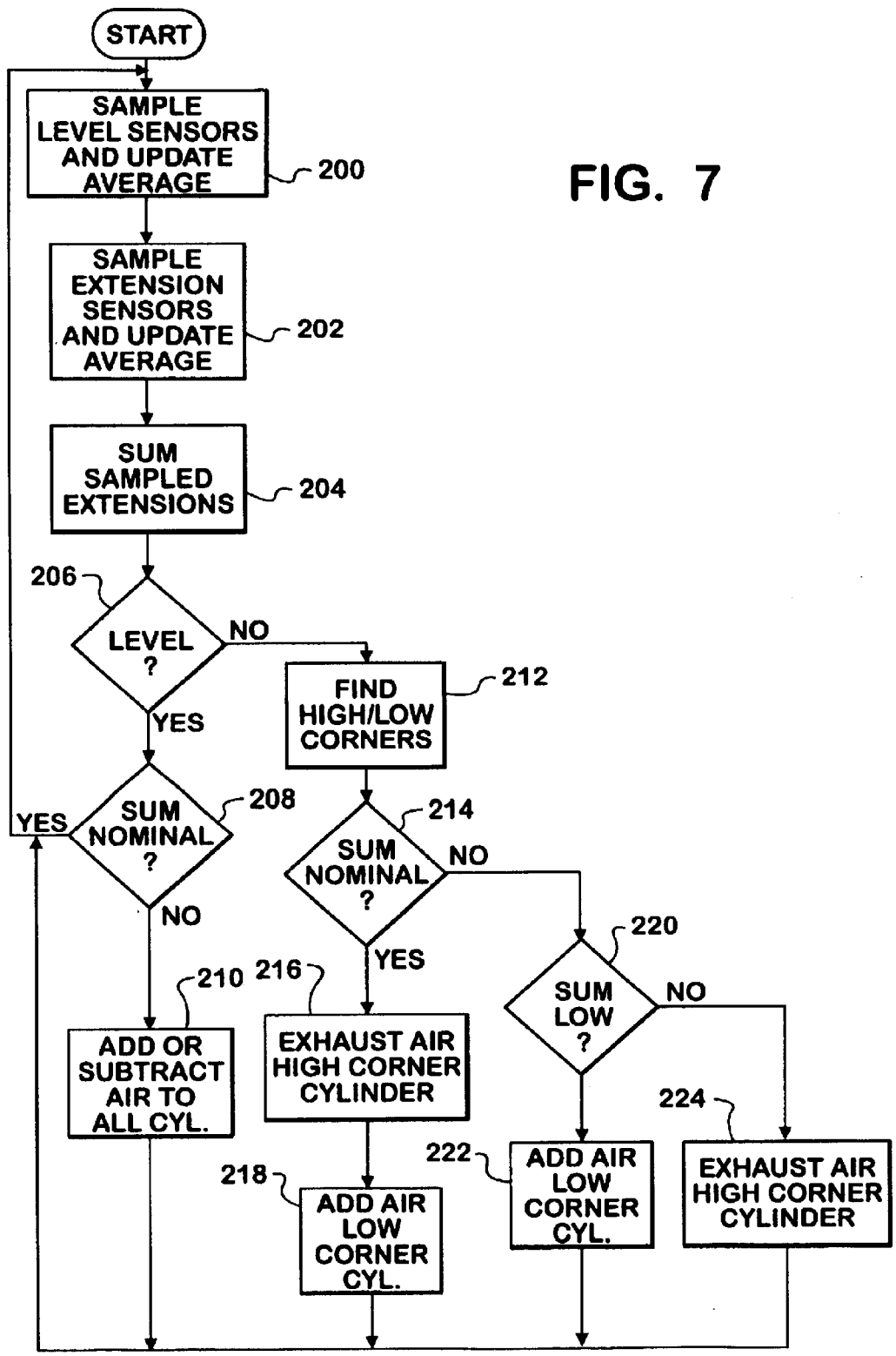
FIG. 7 is a flow chart of a program executed by the microcontroller of FIG. 6.

Referring now to FIG. 7, a flow chart of an exemplary program which can be implemented by controller 160 of FIG. 6 to maintain a mattress platform 143 which is supported at each of its four corners by an air cylinder 133 in a horizontal orientation. At step 200 the program initially collects data from level sensors 168 and uses the new sample data to update a running average of samples. The average may reflect a time decay of older samples or a simple weighted sum of the latest sample with the combined result from the prior sample period. Such averaging or combination is done to reduce the responsiveness of the horizontal leveling system to highly transient changes in orientation. This avoids abrupt shifts in bunk position. The result indicates which, if any corner of the bunk is the lowest and which is the highest relative to horizontal. Next, at step 202 the degree of extension of the extension sensors is determined for each of four sensors. It may be noted that the lowest corner of the platform 143 may be associated with the air cylinder 133 which is most extended. The results are averaged for each cylinder. Again by "averaged" it is meant the latest result is arithmetically combined with prior period results in a way which reduces the responsiveness of the system to a comfortable level for an occupant of the bunk. After averaging of the extension measurements is completed the averages are summed at step 204. At step 206 it is determined from the samples relating to orientation with respect to level of the bunk determined at step 200 indicate if the bunk is level. If YES, step 208 is executed to determine if the sum of air cylinder extensions determined at step 204 is nominal. If YES, processing returns to step 200 to collect a new set of samples. If NO, step 210 provides that a quanta of air is added to or subtracted from all of cylinders 133 to move the bunk up or down and bring the extension of the cylinders into line with the desired amount.

If at step 206, it were determined that platform 143 was not level, than the updated information from the level sensors determined at step 200 is analyzed to find the high and low corners of the platform relative to the true horizontal. Next, at step 214 it is determined if the total extension of the air cylinders determined at step 204 is nominal. If the total extension is nominal, the YES branch from decision step 214 is taken resulting in air being exhausted from the air cylinder associated with the highest corner (step 216) and air being added to the lowest corner cylinder 218. Program execution then returns to step 200 to collect additional samples. If at step 214 it was determined that the total extension of the air cylinders was not nominal, step 220 following along the NO branch is used to determine if the total extension was too small. If YES, step 222 is executed to add a quantity of air to the air cylinder associated with the lowest corner. If NO, step 224 is executed to exhaust air from the air cylinder associated with the highest corner of platform 143. After either of steps 222, 224 program execution returns to step 200.

The invention provides a simple bunk leveling system easily installable with new or existing extended cab bunk assemblies. The invention preserves space under the bunk assembly in a supporting bulkhead for use as a storage area. It will be appreciated by those skilled in the art that alternative arrangements of the air cylinder are possible, including, by way of example, three cylinders arranged as a tripod support, or from cylinders disposed to support the mattress platform along its edges.

While the invention is shown in only one of its forms, it is not thus limited but is susceptible to various changes and modifications without departing from the spirit and scope of the invention.

What is claimed is:

1. A bunk assembly for a vehicle comprising:
   a mattress platform;
   a plurality of vertically adjustable support pillars disposed to support the mattress platform from underneath, the plurality of vertically adjustable support pillars being independently adjustable;

first and second level sensors mounted with respect to the mattress platform, one level sensor being associated with each one of two axes of a plane parallel to the mattress platform; and a mattress platform position controller being coupled to receive output signals from the first and second level sensors and being responsive thereto for providing independent control of the vertical extension of each of the plurality of vertically adjustable support pillars to maintain the mattress base in a horizontally level position.

2. A bunk assembly as set forth in claim 1, further comprising:

an extension sensor for each vertically adjustable support pillar; and the mattress platform position controller being coupled to receive output signals from the extension sensors and responsive thereto for limiting the collective extension of the plurality of vertically adjustable support pillars.

3. A bunk assembly as set forth in claim 2, further comprising:

the mattress platform being rectangular and the plurality of vertically adjustable supports being disposed to support the mattress platform at the four corners of the mattress platform; and each vertically adjustable support pillar being an air cylinder.

4. A bunk assembly as set forth in claim 3, further comprising a source of compressed air connectable to any selected air cylinder by the mattress base controller.

5. A bunk assembly as set forth in claim 4, further comprising:

a base frame located under the mattress platform providing a base for the plurality of air cylinders;

a support assembly comprising the mattress platform, air cylinders and the support frame; and a hinge extending from the back of the base frame for attachment to a vehicle bulkhead allowing the support assembly to be pivoted upwardly along one edge.

6. A bunk assembly as set forth in claim 5, further comprising:

a lift switch responsive to position of the support assembly for disabling operation of the mattress platform position controller.

7. A motor vehicle comprising:

a cab;

a bulkhead located in the cab;

a sleeping platform supported on the bulkhead;

a plurality of extensible elements mounted with respect to the bulkhead and attached to the sleeping platform for leveling the sleeping platform;

first and second level sensors mounted with respect to the sleeping platform, one level sensor being associated each of two axes of a plane parallel to the sleeping platform; and a platform level controller being coupled to receive output signals from the first and second level sensors and being responsive thereto for providing independent control of the vertical extension of each of the plurality of extensible elements.

8. A vehicle as set forth in claim 7, further comprising:

an extension sensor for each extensible element; and the platform level controller being coupled to receive output signals from the extension sensors and responsive thereto for limiting the collective extension of the plurality of vertically adjustable support pillars.

9. A vehicle as set forth in claim 8, further comprising:

each extensible element being an air cylinder; and a source of compressed air connectable to any selected air cylinder by the platform level controller.

10. A vehicle as set forth in claim 9, the sleeping platform further comprising:

a mattress platform supported by the plurality of air cylinders;

a base frame located under the mattress platform providing a base for the plurality of air cylinders;

a hinge extending from the back of the base frame for attachment to the cab allowing the sleeping platform to be pivoted up along one edge to give access to an interior space defined by the bulkhead.

11. A vehicle as set forth in claim 10, further comprising:

a lift switch responsive to position of the support assembly for disabling operation of the sleeping platform level controller.

\* \* \* \* \*